US010546106B2

(12) United States Patent
Mau

(10) Patent No.: US 10,546,106 B2
(45) Date of Patent: Jan. 28, 2020

(54) BIOMETRIC VERIFICATION

(71) Applicant: iOmniscient Pty Ltd, Gordon, New South Wales (AU)

(72) Inventor: Sandra Mau, Eveleigh (AU)

(73) Assignee: iOmniscient Pty Ltd, Gordon (AU)

( * ) Notice: Subject to any disclaimer, the term of this patent is extended or adjusted under 35 U.S.C. 154(b) by 0 days.

(21) Appl. No.: 14/405,304

(22) PCT Filed: Jun. 4, 2013

(86) PCT No.: PCT/AU2013/000588
§ 371 (c)(1),
(2) Date: Dec. 3, 2014

(87) PCT Pub. No.: WO2013/181695
PCT Pub. Date: Dec. 12, 2013

(65) Prior Publication Data
US 2015/0113634 A1  Apr. 23, 2015

(30) Foreign Application Priority Data

Jun. 4, 2012 (AU) .............................. 2012902317

(51) Int. Cl.
*G06F 21/32* (2013.01)
*H04L 29/06* (2006.01)
*H04L 9/32* (2006.01)

(52) U.S. Cl.
CPC ............ *G06F 21/32* (2013.01); *H04L 9/3231* (2013.01); *H04L 63/0861* (2013.01)

(58) Field of Classification Search
CPC .... G06F 21/32; H04L 63/0861; H04L 9/3231
See application file for complete search history.

(56) References Cited

U.S. PATENT DOCUMENTS 8,526,682 B2 *   9/2013  Sahin ................. G06K 9/00006
                                                              340/5.83
9,262,613 B1 *   2/2016  Harding .................. G06F 21/32
(Continued)

OTHER PUBLICATIONS

Shan, Ting; Chen, Shaokang; Sanderson, Conrad; Lovell, Brian C.; "Towards Robust Face Recognition for Intelligent-CCTV Based Surveillance Using One Gallery Image", IEEE Conference on Advanced Video and Signal Based Surveillance, Sep. 5-7, 2007, pp. 470-475.*

(Continued)

*Primary Examiner* — Victor Lesniewski
(74) *Attorney, Agent, or Firm* — Fitch, Even, Tabin & Flannery LLP

(57) ABSTRACT

A method of verifying an input biometric identifier against a reference biometric identifier is disclosed in this specification. The method comprises evaluating the input biometric identifier relative to a group (the 'cohort') to improve verification accuracy. Up to three matching scores are used to determine a verification probability for the input biometric identifier. The three matching scores measure the similarity of the input biometric identifier to the biometric identifiers of the cohort, the similarity of the reference biometric identifier to the biometric identifiers of the cohort and the similarity of the input biometric identifier to the reference biometric identifier.

15 Claims, 3 Drawing Sheets

(56) References Cited

U.S. PATENT DOCUMENTS

| | | | |
|---|---|---|---|
| 2003/0051147 A1* | 3/2003 | Maeda | G06F 21/32 713/186 |
| 2004/0243356 A1* | 12/2004 | Duffy | G06K 9/00087 702/189 |
| 2004/0243567 A1* | 12/2004 | Levy | G06F 17/30032 |
| 2005/0138394 A1* | 6/2005 | Poinsenet | G06F 21/32 713/186 |
| 2005/0238207 A1* | 10/2005 | Tavares | G06K 9/00885 382/115 |
| 2006/0120569 A1* | 6/2006 | Kim | G06K 9/00362 382/115 |
| 2006/0153428 A1* | 7/2006 | Yoshiura | G06F 21/32 382/115 |
| 2007/0031014 A1* | 2/2007 | Soderberg | G06K 9/00093 382/125 |
| 2007/0036398 A1 | 2/2007 | Chen | |
| 2007/0172114 A1 | 7/2007 | Baker et al. | |
| 2008/0101658 A1* | 5/2008 | Ahern | G06F 21/32 382/115 |
| 2008/0104006 A1* | 5/2008 | Kiefer | G06N 99/005 706/48 |
| 2008/0260212 A1* | 10/2008 | Moskal | A61B 5/1079 382/118 |
| 2009/0171623 A1* | 7/2009 | Kiefer | G06N 99/005 702/181 |
| 2010/0131279 A1* | 5/2010 | Pilz | G06F 21/32 704/273 |
| 2010/0316261 A1* | 12/2010 | Sugimura | G06K 9/00087 382/115 |
| 2011/0138187 A1* | 6/2011 | Kaga | G06F 21/32 713/186 |
| 2011/0182480 A1 | 7/2011 | Murakami et al. | |
| 2012/0253154 A1* | 10/2012 | Phillips | A61B 5/117 600/324 |
| 2012/0275663 A1* | 11/2012 | Craft | G06K 9/00885 382/115 |
| 2012/0314911 A1* | 12/2012 | Paul | G06F 21/32 382/115 |
| 2013/0239191 A1* | 9/2013 | Bostick | G06F 21/316 726/7 |
| 2013/0268563 A1* | 10/2013 | Shiell | G06K 9/00885 707/797 |
| 2013/0290229 A1* | 10/2013 | Tsukamoto | G06F 21/32 706/12 |
| 2014/0188770 A1* | 7/2014 | Agrafioti | A61B 5/117 706/13 |

OTHER PUBLICATIONS

Mau, Sandra; Chen, Shaokang; Sanderson, Conrad; Lovell, Brian C.; "Video Face Matching using Subset Selection and Clustering of Probabilistic Multi-Region Histograms", 25$^{th}$ IEEE International Conference of Image and Vision Computing New Zealand, Nov. 8-9, 2010, pp. 1-8.*

Cardinaux, Fabien; Sanderson, Conrad; Bengio, Samy; "User Authentication via Adapted Statistical Models of Face Images", IEEE Transactions on Signal Processing, vol. 54, Issue 1, Dec. 19, 2005, pp. 361-373.*

International Search Report for International Application No. PCT/AU2013/000588 dated Aug. 28, 2013.

Sanderson et al., Multi-Region Probabilistic Histograms for Robust and Scalable Identity Inference, 2009, pp. 199-208, ICB 2009, LNCS 5558.

* cited by examiner

BIOMETRIC VERIFICATION

CROSS-REFERENCE TO RELATED APPLICATION

This application is a U.S. national phase application of International Application No. PCT/AU2013/000588, filed Jun. 4, 2013, designating the United States, which claims priority to Australian Patent Application No. 2012902317, filed Jun. 4, 2012, both of which are incorporated by reference herein in their entirety.

TECHNICAL FIELD

This disclosure concerns verification of a subject based on biometric identifiers. In particular, the invention concerns, but is not limited to, a method, software and a computer system for verifying a person using biometric identifiers.

BACKGROUND

Biometric verification is performed when a user of a system, such as a money dispenser or an access control of a building, claims to be a particular authorised user, such as by presenting bank card or ID card. The system then receives input of biometric information, such as a face image, from the user and compares the biometric information to previously stored biometric information of that particular authorised user. If the comparison results in a determination of a match, access to the system or the building is granted.

This way, an unauthorised user can not get access by presenting a stolen bank card or ID card even when the unauthorised user knows a secret PIN code associated with the authorised user.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY OF THE INVENTION

In a first aspect there is provided a computer implemented method for verifying an input biometric identifier against a reference biometric identifier, the method comprising:
  determining first matching scores, each first matching score representing a similarity between the input biometric identifier and a biometric identifier of a cohort of multiple biometric identifiers;
  determining or accessing second matching scores, each second matching score representing a similarity between the reference biometric identifier and a biometric identifier of the cohort;
  determining a third matching score representing a similarity between the input biometric identifier and the reference biometric identifier; and
  determining a verification probability for the input biometric identifier based on the determined first, second and third matching scores.

It is an advantage of an embodiment of the invention that the method determines matching scores representing the similarity between the reference biometric identifier and the biometric identifiers of the cohort and between the input biometric identifier and the biometric identifiers of the cohort. As a result, the method has available matching scores which the method then uses to determine a verification probability.

It is a further advantage of an embodiment of the invention that the method determines a verification probability. Since a probability is normalised to lie between 0 and 1, the verification probability has a clear and consistent meaning across different platforms, across different algorithms for determining the matching scores and across different types of biometric identifiers.

The biometric identifier may be a face image.

It is an advantage of an embodiment to utilise face images, since face images are relatively uncomplicated to capture using commercially available cameras.

Determining the verification probability may comprise:
  determining a first probability of the first matching scores;
  determining a second probability of the second matching scores; and
  determining a third probability of the third matching score.

It is an advantage of an embodiment determine these probabilities. Since all probabilities are normalised and are between 0 and 1, this step enables the method to multiply the probabilities to determine a verification probability.

Determining the first and second probabilities may be based on a first distribution of matching scores between a first and second biometric identifier of multiple pairs of biometric identifiers, the first and second identifier belonging to different subjects, and determining the third probability may be based on a second distribution of matching scores between a first and second biometric identifier of multiple pairs of biometric identifiers, the first and second identifier belonging to the same subject.

It is an advantage of an embodiment that the first distribution is based on biometric identifiers from different subjects and the second distribution is based on biometric identifiers from the same subject. As a result, the method is based on an imposter and a genuine distribution, both of which can be easily determined from a sufficiently large number of biometric identifiers.

At least one of the first and second distribution may be pre-trained.

It is an advantage of an embodiment that the distributions are pre-trained. Once the method is initialised with the pre-trained distributions it is computationally inexpensive to determine the probabilities based on the pre-trained distributions. As a result, the verification of a biometric identifier is fast and can be implemented on inexpensive hardware.

The computer implemented method may further comprise the step of determining the first distribution based on the first and second matching scores.

It is an advantage of an embodiment that the first distribution is determined by the method. As a result, the first distribution, that is the imposter distribution is computed dynamically and is therefore flexible to change with varying matching scores. As a further advantage, the first distribution does not need to be pre-trained, which results in less complexity to set up the method and reduced memory requirement.

At least one of the first and second pre-trained distribution may be modeled by a Gaussian distribution.

It is an advantage that the distribution is modeled by a Gaussian distribution, since the Gaussian distribution is fully characterised by only two parameters and an analytical expression of the Gaussian distribution exists and allows the derivation of an analytical expression for the matching probability.

Determining a verification probability may comprise:
determining for each biometric identifier of the cohort a probability of that biometric identifier of the cohort matching the input biometric identifier;
determining for each biometric identifier of the cohort a probability of that biometric identifier of the cohort matching the reference biometric identifier; and
determining a probability of the input biometric identifier not matching the reference biometric identifier and not matching any biometric identifier of the cohort.

The verification probability $C_{XY}$ may be determined by the equation $$C_{XY} = \frac{P_{genuine}(S_{XY})P_{imposter}(S_{ca})P_{imposter}(S_{cb})}{P_{YX} + P_{Yy_1} + P_{Yy_2} + \cdots + P_{Xy_1} + P_{Xy_2} + \cdots + P(Y \notin X, y_{1 \ldots N})}$$

$$= \frac{P_{XY}}{\sum P + P(Y \notin X, y_{1 \ldots N})}$$

where
$S_{ca}$ is the first matching scores,
$S_{cb}$ is the second matching scores,
$S_i$ is the third matching score,
$P_{imposter}(S_{ca})$ is the first probability,
$P_{imposter}(S_{cb})$ is the second probability,
$P_{genuine}(S_i)$ is the third probability,
$P_{YX} = P_{genuine}(S_i) P_{imposter}(S_{ca}) P_{imposter}(S_{cb})$,
$P_{Xy_i}$ is the probability of the matching scores $S_{ca}$, $S_{cb}$, $S_i$ and of the reference biometric identifier matching the i-th biometric identifier of the cohort,
$P_{Yy_i}$ is the probability of the matching scores $S_{ca}$, $S_{cb}$, $S_i$ and of the input biometric identifier matching the i-th biometric identifier of the biometric identifiers of the cohort,
$P(Y \notin X, y_{1 \ldots N}) = q\, P_{imposter}(S_{XY})P_{imposter}(S_{ca})P_{imposter}(S_{cb})$, with q being a prior probability that Y is an imposter who is not matching the reference biometric identifier or the biometric identifiers of cohort.

It is an advantage of an embodiment that the above equation comprises only elements that can be determined from the imposter and genuine distributions and that the equation is relatively easy to compute.

The verification probability $C_{XY}$ may be determined by the equation $$C_{XY} = \frac{z_{XY}}{z_{XY} + \sum_i z_{Xy_i} + \sum_i z_{Yy_i} + q\frac{\sigma}{\hat{\sigma}}}$$

where $z_{Yy_i} = \exp\left(\frac{(S_{Yy_i} - \mu)^2}{2\sigma^2} - \frac{(S_{Yy_i} - \hat{\mu})^2}{2\hat{\sigma}^2}\right)$, $S_{Yy_i}$ is the first matching score, $$z_{Xy_i} = \exp\left(\frac{(S_{Xy_i} - \mu)^2}{2\sigma^2} - \frac{(S_{Xy_i} - \hat{\mu})^2}{2\hat{\sigma}^2}\right),$$

$S_{Xy_i}$ is the second matching score, $$z_{XY} = \exp\left(\frac{(S_{XY} - \mu)^2}{2\sigma^2} - \frac{(S_{XY} - \hat{\mu})^2}{2\hat{\sigma}^2}\right),$$

$S_{XY}$ is the third matching score,
$\mu$ is the mean value of the first distribution,
$\sigma$ is the standard deviation of the first distribution,
$\hat{\mu}$ is the mean value of the second distribution,
$\hat{\sigma}$ is the standard deviation of the second distribution,
q is a prior probability that Y is an imposter who is not matching the reference biometric identifier or the biometric identifiers of cohort.

The computer implemented method may further comprise the steps of
receiving or accessing multiple candidate biometric identifiers, each of which being associated with a user identifier;
receiving or accessing a user identifier; and
selecting as the reference biometric identifier one of the multiple candidate biometric identifiers that is associated with substantially the same user identifier as the received user identifier.

It is an advantage of an embodiment that the method receives or accesses a user identifier and selects the reference biometric identifier based on the user identifier. As a result, the method can be used in access terminals where users identify themselves by presenting a user identifier.

The computer implemented method may further comprise the step of sending a success signal or storing on a data memory success data when the determined verification probability is above a predetermined threshold.

It is an advantage of an embodiment that the method sends a success signal or stores success data. As a result, the method is useful in systems where a display or an access mechanism is responsive to the success signal or success data to grant access for a user if the user is verified and deny access otherwise.

In a second aspect there is provided software, that when installed on a computer causes the computer to perform the method for verifying an input biometric identifier against a reference biometric identifier, of the first aspect of the invention.

In a third aspect there is provided a computer system for verifying an input biometric identifier against a reference biometric identifier, the computer system comprising:
a processor
to access or receive the input biometric identifier;
to access or receive the reference biometric identifier, and
to access or receive a cohort comprising multiple biometric identifiers;
to determine first matching scores, each first matching score representing a similarity between the input biometric identifier and one biometric identifier of the cohort;
to access or determine second matching scores, each first matching score representing a similarity between the reference biometric identifier and one biometric identifier of the cohort; and
to determine a third matching score representing a similarity between the input biometric identifier and the reference biometric identifier and to determine a verification probability for the input biometric identifier based on the determined first, second and third matching scores.

The computer system may further comprise an input port to receive the input biometric identifier.

The computer system may further comprise a memory to store the reference biometric identifier and the multiple biometric identifiers of the cohort.

In a forth aspect there is provided a method for verifying an input biometric identifier against a reference biometric identifier, the method comprising:

> determining first matching scores, each first matching score representing a similarity between the input biometric identifier and a biometric identifier of a cohort of multiple biometric identifiers;
>
> determining or accessing second matching scores, each second matching score representing a similarity between the reference biometric identifier and a biometric identifier of the cohort;
>
> determining a third matching score representing a similarity between the input biometric identifier and the reference biometric identifier; and
>
> determining a verification probability for the input biometric identifier based on the determined first, second and third matching scores.

Optional features described of any aspect, where appropriate, similarly apply to the other aspects also described here.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Further, the use of words in plural form describes both singular and plural.

BRIEF DESCRIPTION OF DRAWINGS

Features and advantages of the present invention will become apparent from the following description of embodiments thereof, by way of example only, with reference to the accompanying drawings, in which.

DETAILED DESCRIPTION

Figure 1:
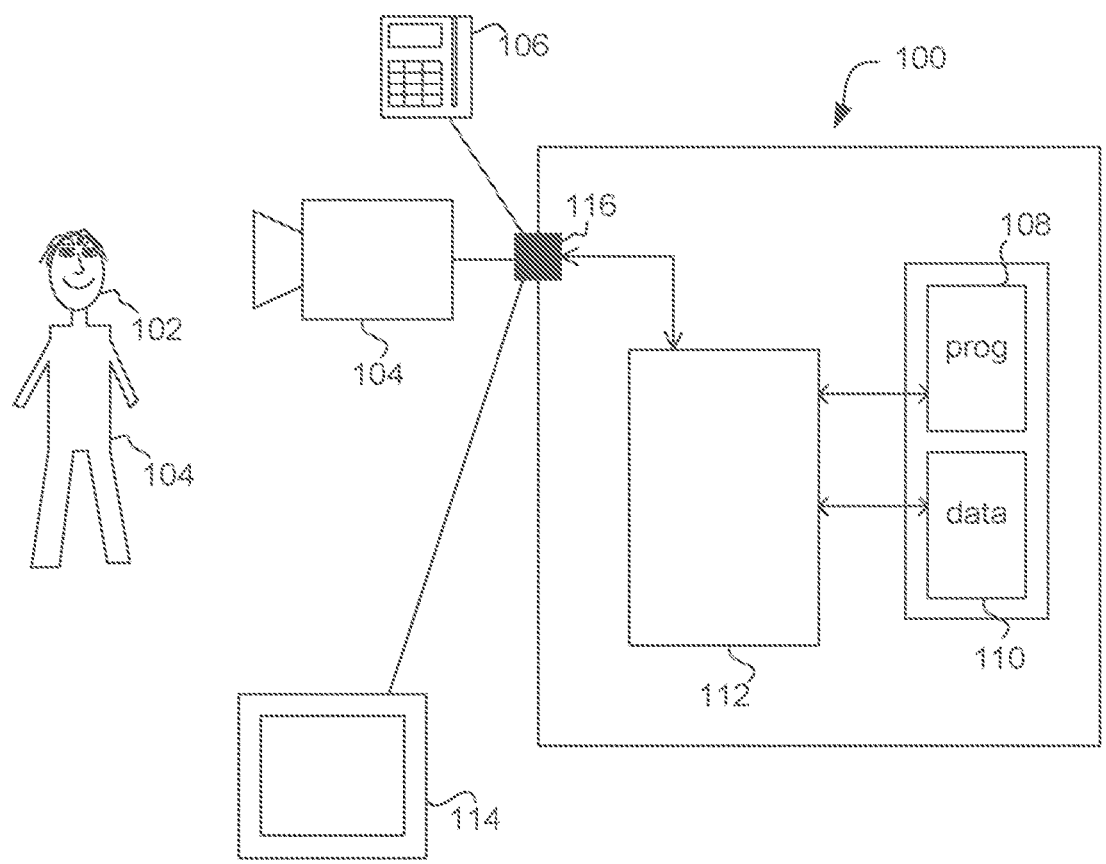
FIG. 1 illustrates a computer system for verifying an input biometric identifier against a reference biometric identifier, in accordance with an embodiment of the present invention.

FIG. 1 illustrates a computer system 100 verifying an input biometric identifier against a reference biometric identifier. A biometric identifier is any descriptor of a subject being verified that substantially uniquely describes the subject. The subject may be a person, animal, etc. In this example, the biometric identifier is a face image of a face 102 of user 104. In different examples, the biometric identifier is a fingerprint, retinal scan or voice recording. It could be any other biometric identifier. The computer system 100 receives the face image from camera 104 and receives a user identifier, such as a user name or account number, from input device 106. The computer system 100 comprises a program memory 108, a data memory 110 and a processor 112. The computer system 100 is connected to the camera 104, the input device 106 and a display 114 via a port 116.

Multiple face images of a cohort are stored on the data memory 110. A cohort is a group of subjects, such as persons, who are either registered with the system 100 or are used by system 100 to verify users. Where the biometric identifier is of a person registered with the system, that biometric identifier is associated in memory 110 with a user ID of that user. The user may have one or more biometric identifiers stored in memory. A biometric identifier, such as a face image, is stored on the data memory 110 for each person of the cohort. As a result, the cohort, as stored on data memory 110, comprises multiple biometric identifiers. In one example, the cohort comprises no duplicates, that is it comprises only one face image per unique person.

Further stored on the data memory 110 are up to two pre-trained models of statistical distributions of matching scores. One model is provided for matching scores of a genuine comparison, which is a probability distribution for matching scores where the two biometric identifiers being compared belong to the same subject, that is the two biometric identifiers match.

"Match" means that the two biometric identifiers belong to the same subject, for example, two face images belong to the same person. Since face images are often captured under different conditions there is naturally some variation in matching score between the different pairs of face image biometric identifiers being compared.

A second model is provided for matching scores of an imposter comparison, that is a comparison of two biometric identifiers belonging to two different subjects. In one example, a pdf or a histogram is stored as a table of data values, such that probabilities for particular matching scores can be determined by interpolating the probabilities of the closest matching scores available in the table. In a different example, the distributions are modeled by an analytical function, such as by a Gaussian distribution function $$f(x, \mu, \sigma^2) = \frac{1}{\sigma\sqrt{2\pi}} e^{-\frac{1}{2}\left(\frac{x-\mu}{\sigma}\right)^2}.$$

As a result, only the values for parameters of the analytical function, such as $\mu$ and $\sigma$ are stored on data store 110 for the statistical distribution of each of the two models. These values can be determined during a pre-training phase performing a large number of genuine and imposter comparisons, respectively.

Alternatively, the imposter pdf can be dynamically generated using the matching scores of each individual comparison by modeling the matching scores of the two images being compared to the cohort. The subjects in the cohort are assumed to be imposters (not matching either of the two faces being compared), thus a model can be derived, for example by calculating the $\mu$ and $\sigma$ and assuming a Gaussian distribution.

A user 104 provides a user identifier to the computer system 100 by using the input device 106. In one example, the user identifier is a user number stored on a card that the user 104 presents using a card reader integrated into the input device 106. In a different example, the user 104 enters a user number or user name into the input device 106.

During verification, the processor 112 receives the user identifier and retrieves from the data memory 110 a reference face image that is associated with that user identifier. In one example, the processor 112 selects one or multiple candidate face images that is associated with the same user identifier as the received user identifier. In one example, the cohort comprises the face images not associated with the received user identifier, that is the candidate face images that are not selected by the processor 112 as the reference face image.

The computer system 100 receives an input face image from the camera 102, which is stored in local data memory 110 by processor 112. The processor 112 uses software stored in program memory 108 to perform the method shown in FIG. 2. In this sense the processor 112 performs the method of verifying an input face image against a reference face image.

In one example, the processor 112 determines three sets of matching scores: (1) matching scores that represent a similarity between the input face image and each face images of the cohort; (2) matching scores that represent the similarity between the reference face image and each face image of the cohort; and (3) a matching score that represents the similarity between the input face image and the reference face image.

In a different example where the input face image will be individually compared against each of the cohort faces which are taken as reference faces in turn (for example, identifying an input image against a gallery of identities), the processor 112 determines only the two sets of matching scores (1) and (3).

Typically, matching scores are not intuitive because the scales across various biometric systems may vary, for instance even differing in high or low matching scores as being more or less similar. One of the main reasons for this is that matching scores are relative, that is they represent the relative similarity between two biometric identifiers without reference to an absolute value, such as a perfect match or a complete mismatch.

The proposed method determines matching scores between the input and reference biometric identifier as well as between these identifiers and the identifiers of a cohort. As a result, the matching score between the input and the reference biometric identifier can be normalised by the matching scores of the cohort and an absolute probability with values between 0% and 100%. That is, the processor 112 determines a verification measure, in this example a matching probability, based on the three determined sets of matching scores. If the matching probability is above a predetermined threshold, such as 99%, the verification is successful and the processor 112 grants access to the user 104 and displays a confirmation on display 114.

In one example, the processor 112 is connected to an access mechanism, such as turnstiles, and the processor 112 sends a success signal to the access mechanism when the verification is successful. In another example, the processor 112 stores success data, such as by setting a single-bit Boolean flag, on data memory 110 or a register when the verification is successful. The access mechanism or any other peripheral device reads the data memory 110 to read the flag and grants access if the flag is set. The access mechanism or the processor 112 resets the flag once the user has passed the access mechanism.

Figure 2:
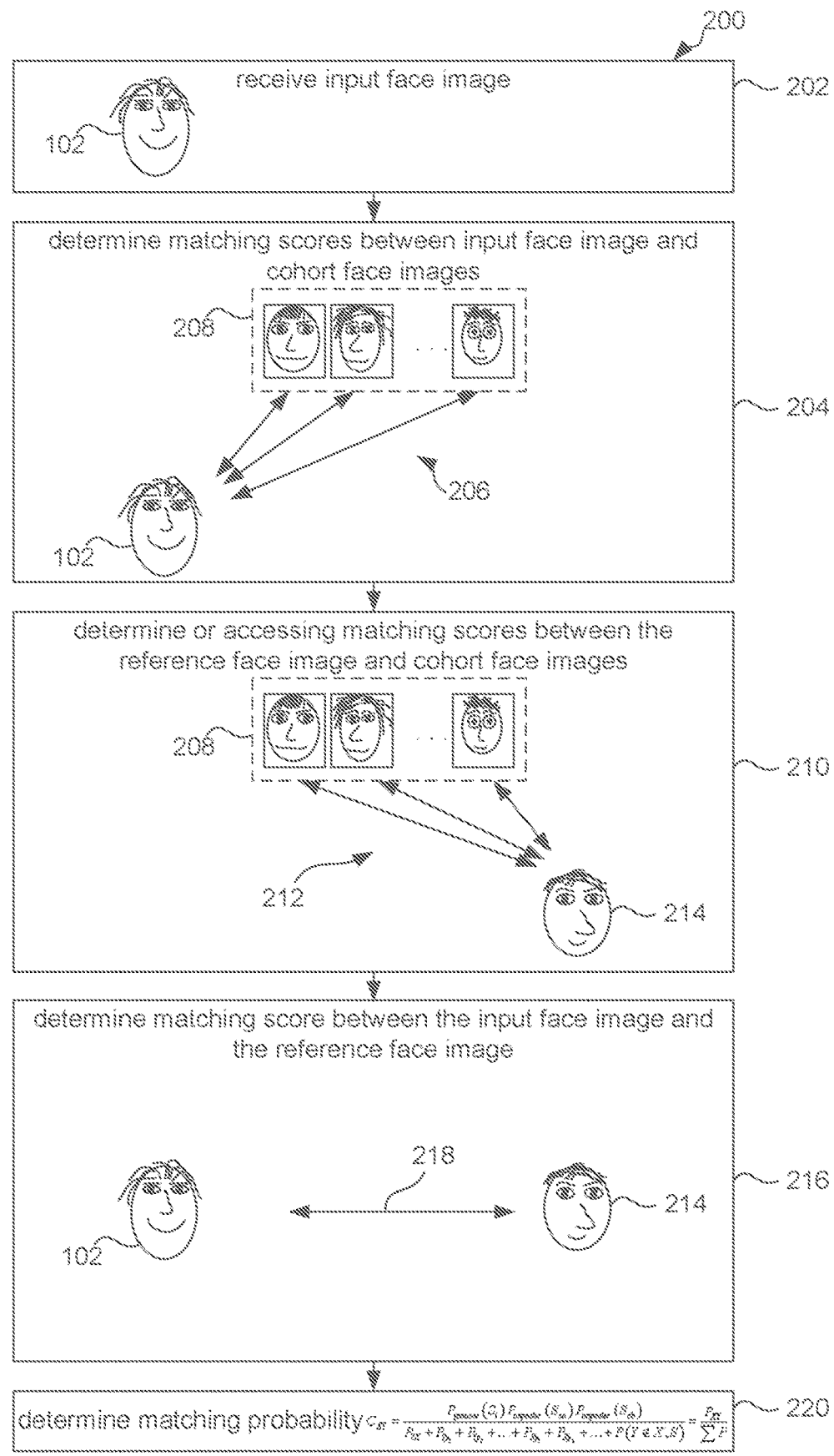
FIG. 2 illustrates a method for verifying an input biometric identifier against a reference biometric identifier, in accordance with an embodiment of the present invention.

FIG. 2 illustrates a method 200 for verifying an input biometric identifier, such as a face image, against a reference biometric identifier. A verification probability is a number between 0% and 100% that represents the probability that the input face image and the reference face image match, that is that they are images of the same person. In this example, the verification probability is a normalised value and a threshold can be set up that has an intuitive meaning. It also allows for the combination of several different biometric systems (i.e. combining iris, face, voice) using probabilities rather than matching scores of different scales.

The method 200 commences with receiving 202 an input biometric identifier 102. The method 200 then determines 204 first matching scores 206 between the input biometric identifier 102 and each biometric identifier of cohort 208 stored on data memory 110.

One example of a biometric matching score is a face recognition matching algorithm using the bag-of-visual-words approach called Probabilistic Multi-Region Histogram (MRH). More detailed information can be found in [SAN09], which is incorporated herein by reference. For each face, a probability histogram is extracted as a signature. Faces are compared using L1-norm distance calculation between the two histograms resulting in a matching score scale where 0 indicates an exact match, and increasing value indicating decreasing similarity, with a value above 1 indicating a relatively poor match.

The method 200 then determines 210 second matching scores 212 between the reference biometric identifier 214 and each of the multiple biometric identifiers of the cohort 208. The matching scores are symmetric, that is the matching score between the reference biometric identifier 214 and a biometric identifier of the cohort 208 is the same as the matching score between the biometric identifier of the cohort 208 and the reference biometric identifier 214.

In one example, the initial cohort comprises the reference biometric identifier and the matching scores of all pairs of biometric identifiers of the cohort are determined during training and stored on data memory 110. The processor 112 receives a user identifier and accesses the biometric identifier associated with the user identifier as the reference biometric identifier. Then the processor 112 also accesses the matching scores for all pairs that contain that reference biometric identifier and removes the reference biometric identifier from the initial cohort. As a result, the second matching scores do not need to be computed each time a verification is performed which reduces the computational load of processor 112.

After determining or accessing the matching scores 212 between the reference biometric identifier 214 and biometric identifiers of the cohort 208, the method 200 determines 216 a third matching score 218 between the input biometric identifier 102 and the reference biometric identifier 214. As a next step, the method 200 determines 220 a verification probability based on the first, second and third matching scores determined in steps 204, 210 and 216.

Figure 3:
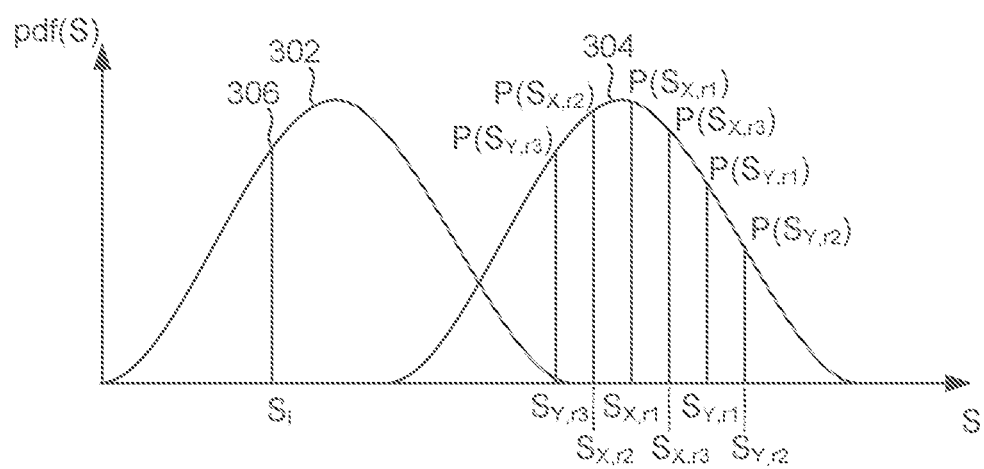
FIG. 3 illustrates a genuine probability density function (pdf) of matching scores for a genuine comparison and an imposter pdf of matching scores for an imposter comparison, carried out in accordance with an embodiment of the present invention.

The step of determining 220 a matching probability will now be explained with reference to FIG. 3, which illustrates a genuine probability density function (pdf) 302 of matching scores for a genuine comparison and an imposter pdf 304 of matching scores for an imposter comparison. It is noted that FIG. 3 illustrates a matching score scale representing a distance between two face images (as described by the MRH algorithm above) and as a result, a lower matching score reflects a better match than a higher matching score. However, in general, this does not have to be the case (i.e. biometric systems may also have a scale where a higher number indicates better match).

The genuine and imposter pdf will be biometric system dependent, while the approach proposed here is applicable in any case. In particular, both pdfs are different for different matching algorithms and different biometric identifiers, such as iris scan. However, the behaviour of the different matching algorithms is characterised quantitatively by the genuine and imposter pdfs. Since the method employs the same matching algorithm for determining the matching scores as for determining the imposter and genuine pdfs, the method can normalise the matching score by eliminating the characteristic of the matching algorithm as described below.

In this example, it is assumed that the input face image 102, denoted as Y, is an image of the same person as the reference image 214, denoted as X, that is the two face images match and the input face image should be verified. $S_{XY}$ denotes the matching score between the input face image Y and the reference face image X and $P_{genuine}(S_{XY})$ denotes the probability 306 of $S_i$. $S_{Y,yi}$ is the matching score between the input face image Y and face image yi of the cohort 208 while $S_{X,yi}$ is the matching score between the reference face image X and face image yi of the cohort. Accordingly, $P_{imposter}(S_{X,yi})$ and $P_{imposter}(S_{Y,yi})$ are the respective probabilities for $S_{X,yi}$ and $S_{Y,yi}$. Since the reference image X is not part of the cohort and no other face image of the same person as that of the reference image X is part of the cohort, the probabilities $P(S_{X,yi})$ and $P(S_{Y,yi})$ are taken from the imposter distribution 304.

The aim is to find the conditional probability C for X=Y given all the matching scores S, in other words $C_{XY}=P(X=Y|S)$ According to the general rule of conditional probabilities $$P(A \mid B) = \frac{P(A, B)}{P(B)}$$

the method determines the numerator, which is $P(Y=X, S=\{S_{XY}, S_{ca}, S_{cb}\})$ and the denominator $P(S)$ separately.

The combined imposter probability of matching scores between input face image Y and N face images of the cohort is defined as the product of above mentioned probabilities:

$$P_{imposter}(S_{ca}) = \prod_{i=0}^{N} P_{imposter}(S_{Y,ri})$$

Similarly, the combined imposter probability of matching scores between reference face image X and N face images of the cohort is also defined as the product of above mentioned probabilities:

$$P_{imposter}(S_{cb}) = \prod_{i=0}^{N} P_{imposter}(S_{X,ri})$$

Using the above expressions, the numerator, that is the probability for the person of reference face image X is the same person as in the input face image Y and the matching scores S, can be determined as $$P_{XY} \rightarrow P(Y=X, S=\{S_{XY}, S_{ca}, S_{cb}\}) = P_{genuine}(S_{XY}) P_{imposter}(S_{ca}) P_{imposter}(S_{cb})$$

The denominator is the sum of all possible matches as well as the probability that the match does not exist:

$$P(S = \{S_{XY}, S_{ca}, S_{cb}\}) =$$

$$P(Y=X, S) + \sum_{i=0}^{N} P(Y=y_i, S) + \sum_{i=0}^{N} P(X=y_i, S) + P(Y \notin X, y_{1\ldots N})$$

For each of $P(Y=y_i, S)$ and $P(X=y_i, S)$, the genuine relationship is assumed to match that particular pair be compared, for instance:

$$P_{Yy_i} \rightarrow P(Y=y_i, S=\{S_{XY}, S_{ca}, S_{cb}\}) = P_{genuine}(S_{Yy_i}) P_{imposter}(S_{XY}) P_{imposter}(S_{ca} \setminus S_{Yy_i}) P_{imposter}(S_{cb})$$

$P(Y \notin X, y_{1\ldots N})$ is the probability of all the matching scores S and of the input biometric identifier not matching the reference biometric identifier and not matching any biometric identifier of the cohort. In other words, this is a balancing term to reflect cases where the input biometric identifier is not enrolled. In one example, the biometric identifiers of the cohort and the reference biometric identifier constitute a closed set. In that example, the balancing term is zero.

To calculate $P(Y \notin X, y_{1\ldots N})$, we multiply the probabilities of the following independent events: the prior probability q that Y is an imposter who is not matching the reference images or the cohort. Thus we get:

$$P(Y \notin X, y_{1\ldots N}) = q \cdot P_{imposter}(S_{XY}) P_{imposter}(S_{ca}) P_{imposter}(S_{cb})$$

For convenience or simplicity, we can optionally assume closed set matching, and set $P(Y \notin X, y_{1\ldots N})$ to 0. However, for true absolute probability, this term should be taken into account.

Combining the numerator and denominator results in the solution $C_{xy}$ for the matching probability:

$$C_{XY} = \frac{P_{genuine}(S_{XY}) P_{imposter}(S_{ca}) P_{imposter}(S_{cb})}{P_{YX} + P_{Yy_1} + P_{Yy_2} + \cdots + P_{Xy_1} + P_{Xy_2} + \cdots + P(Y \notin X, y_{1\ldots N})}$$

$$= \frac{P_{XY}}{\sum P + P(Y \notin X, y_{1\ldots N})}$$

$C_{xy}$ is the normalised matching probability that is between 0% and 100% and a predetermined threshold can be set in order to distinguish between input face images that are to be assumed to be verified and those which are to be rejected.

In order to determine the probabilities required in the above equation, in this example, the matching score distributions 302 and 304 are modeled as Gaussian distributions. The parameters mean μ and standard deviation σ are determined by a training phase, that is the computer system 100 is pre-trained to learn expected imposter and genuine distributions for the biometric system.

A specific implementation of the above approach is to model the matching score probability distributions as Gaussian distribution. Assume the biometric system produces matching scores with a genuine distribution G which follows a Normal probability distribution of $N(\hat{\mu}, \hat{\sigma})$, and imposter distribution r which follows a Normal probability distribution of $N(\mu, \sigma)$. The Gaussian pdf is defined as:

$$f(x; \mu, \sigma^2) = \frac{1}{\sqrt{2\pi\sigma^2}} e^{-(x-\mu)^2/(2\sigma^2)}$$

Substituting this into the numerator $P_{XY}$ as defined above, $$P_{XY} \rightarrow P(Y = X, S) = \frac{1}{\sqrt{2\pi\hat{\sigma}^2}} \exp\left(\frac{-(S_{XY} - \hat{\mu})^2}{2\hat{\sigma}^2}\right) \prod_{S_{AB}=\{S_{ca}, S_{cb}\}} \frac{1}{\sqrt{2\pi\sigma^2}} \exp\left(\frac{-(S_{AB} - \mu)^2}{2\sigma^2}\right)$$

For the denominator, $$P_{XY} + P_{X_{y_1}} + P_{X_{y_2}} + \ldots + P_{Y_{y_1}} + P_{Y_{y_2}} + \ldots + P(Y \notin X, y_{1 \ldots N})$$

The term $P(Y \notin X, y_{1 \ldots N})$, can be written as $$P(Y \notin X, y_{1 \ldots N}) = qP_{imposter}(S_{XY})P_{imposter}(S_{ca})P_{imposter}(S_{cb})$$

$$= q \prod_{S_{AB}=\{S_{XY}, S_{ca}, S_{cb}\}} \frac{1}{\sqrt{2\pi\sigma^2}} \exp\left(\frac{-(S_{AB} - \mu)^2}{2\sigma^2}\right)$$

And the other terms $P_{AB}$ summed in the denominator each assumes the identifiers A,B being compared are genuine and the rest are imposters ($P_{XY}$ is an example).

When placed into the confidence equation:

$$C_{XY} = \frac{P_{XY}}{P_{YX} + P_{Y_{y_i}} + \cdots + P_{X_{y_i}} + \cdots + P(Y \notin X, y_{1 \ldots N})}$$

Both the numerator and denominator can be divided by $$\prod_{S_{AB}=\{S_{XY}, S_{ca}, S_{cb}\}} \frac{1}{\sqrt{2\pi\sigma^2}} \exp\left(\frac{-(S_{AB} - \mu)^2}{2\sigma^2}\right)$$

Which reduces the equation to:

$$C_{XY} = \frac{\exp\left(\frac{(S_{XY} - \mu)^2}{2\sigma^2} - \frac{(S_{XY} - \hat{\mu})^2}{2\hat{\sigma}^2}\right)}{\exp\left(\frac{(S_{XY} - \mu)^2}{2\sigma^2} - \frac{(S_{XY} - \hat{\mu})^2}{2\hat{\sigma}^2}\right) + \left[\sum_{i=1}^{N} \exp\left(\frac{(S_{Y_{y_i}} - \mu)^2}{2\sigma^2} - \frac{(S_{Y_{y_i}} - \hat{\mu})^2}{2\hat{\sigma}^2}\right) + \exp\left(\frac{(S_{X_{y_i}} - \mu)^2}{2\sigma^2} - \frac{(S_{X_{y_i}} - \hat{\mu})^2}{2\hat{\sigma}^2}\right)\right] + q\frac{\sigma}{\hat{\sigma}}}$$

$$C_{XY} = \frac{z_{XY}}{z_{XY} + \sum_{AB=\{X_{y_i}, Y_{y_i}\}} z_{AB} + q\frac{\sigma}{\hat{\sigma}}}$$

where $z_k = \exp\left(\frac{(S_k - \mu)^2}{2\sigma^2} - \frac{(S_k - \hat{\mu})^2}{2\hat{\sigma}^2}\right)$ The denominator can then be expanded to separate the terms for the comparison between the reference and cohort face images from the terms for the comparison between the input and cohort face images:

$$C_{XY} = \frac{z_{XY}}{z_{XY} + \sum_i z_{X_{y_i}} + \sum_i z_{Y_{y_i}} + q\frac{\sigma}{\hat{\sigma}}}$$

with $z_{Y_{y_i}} = \exp\left(\frac{(S_{Y_{y_i}} - \mu)^2}{2\sigma^2} - \frac{(S_{Y_{y_i}} - \hat{\mu})^2}{2\hat{\sigma}^2}\right)$, $z_{X_{y_i}} = \exp\left(\frac{(S_{X_{y_i}} - \mu)^2}{2\sigma^2} - \frac{(S_{X_{y_i}} - \hat{\mu})^2}{2\hat{\sigma}^2}\right)$, $z_{XY} = \exp\left(\frac{(S_{XY} - \mu)^2}{2\sigma^2} - \frac{(S_{XY} - \hat{\mu})^2}{2\hat{\sigma}^2}\right)$, The schematic system representation presented in FIG. 1 depicts a functional representation of a biometric verification system. It does not necessarily represent the actual structure or implementation that would be encountered in a practical installation. The biometric verification system components may be implemented by various software and hardware arrangements without altering the fundamental functionality of the system. For instance, the system may be integrated in a centralised server or distributed over several interconnected computing systems without affecting the functionality.

The functional components of the biometric verification system may be implemented in any suitable computing architecture, such as a cloud based system, a virtual machine operating on shared hardware, a dedicated hardware machine or a server bank of connected hardware and/or virtual machines. The term 'computer' in this specification represents general computing system functionality and is not limited to a particular type of hardware or software architecture.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

It will be appreciated by persons skilled in the art that numerous variations and/or modifications may be made to the specific embodiments without departing from the scope as defined in the claims.

REFERENCES

[SAN09] C. Sanderson and B. C. Lovell. *Multi-region probabilistic histograms for robust and scalable identity*

*inference*. In ICB, Lecture Notes in Computer Science (LNCS), volume 5558, pages 199-208, 2009.

The invention claimed is:

1. A computer implemented method for verifying an input biometric identifier of a subject against a reference biometric identifier to provide limited and secured access to a system to a limited number of users, the method comprising, by a processor:

storing a plurality of reference biometric identifiers corresponding to a limited number of authorized users of a system, each reference biometric identifier corresponding to an authorized user and providing limited and secured access for the authorized user to the system;

receiving an input biometric identifier of an intended user of the system, the input biometric identifier being required to match one of the plurality of reference biometric identifiers for controlling limited and secured access to the system;

determining first matching scores, each first matching score representing a similarity between the input biometric identifier and a biometric identifier of a cohort of multiple biometric identifiers stored in a memory operatively coupled to the processor, wherein the cohort is initialised to include the reference biometric identifier, to which the input biometric identifier is required to be matched for access to be secured, as one of an initial cohort;

determining or accessing second matching scores, each second matching score representing a similarity between the reference biometric identifier and a biometric identifier of the cohort;

determining a third matching score representing a similarity between the input biometric identifier and the reference biometric identifier; and determining a verification probability for the input biometric identifier based on the determined first, second and third matching scores, using probability density functions;

wherein determining the verification probability comprises, by the processor:

determining a first probability of the first matching scores;

determining a second probability of the second matching scores;

determining a third probability of the third matching score;

multiplying the first, second and third probabilities together, and verifying the subject based on the determined verification probability; and determining that the intended user is one of the limited number of authorized users based on the verification probability and granting access to the system;

wherein matching scores of all pairs of the multiple biometric identifiers of the initial cohort are determined and stored, and the step of determining or accessing the second matching scores comprises accessing matching scores for all pairs of the multiple biometric identifiers of the initial cohort that contain the reference biometric identifier to which the input biometric identifier is required to be matched for access to be secured;

wherein the reference biometric identifier to which the input biometric identifier is required to be matched for access to be secured is removed from the initial cohort.

2. The computer implemented method of claim 1, wherein the biometric identifier is a face image captured by a camera that is operatively coupled to the processor.

3. The computer implemented method of claim 1, wherein determining the first and second probabilities is based on a first distribution of matching scores between a first and second biometric identifier of multiple pairs of biometric identifiers, the first and second identifier belonging to different subjects, and determining the third probability is based on a second distribution of matching scores between a first and second biometric identifier of multiple pairs of biometric identifiers, the first and second identifier belonging to the same subject.

4. The computer implemented method of claim 3, wherein at least one of the first and second distribution is pre-trained.

5. The computer implemented method of claim 3, further comprising the step of determining the first distribution based on the first and second matching scores.

6. The computer implemented method of claim 3, wherein at least one of the first and second distribution is modelled by a Gaussian distribution.

7. The computer implemented method of claim 1, wherein determining a verification probability comprises, by the processor:

determining for each biometric identifier of the cohort a probability of that biometric identifier of the cohort matching the input biometric identifier;

determining for each biometric identifier of the cohort a probability of that biometric identifier of the cohort matching the reference biometric identifier; and determining a probability of the input biometric identifier not matching the reference biometric identifier and not matching any biometric identifier of the cohort.

8. The computer implemented method of claim 1, wherein the verification probability $C_{XY}$ is determined by the equation $$C_{XY} = \frac{P_{genuine}(S_{XY})P_{imposter}(S_{ca})P_{imposter}(S_{cb})}{P_{YX} + P_{Yy_1} + P_{Yy_2} + \cdots + P_{Xy_1} + P_{Xy_2} + \cdots + P(Y \notin X, y_{1\ldots N})}$$

$$= \frac{P_{XY}}{\sum P + P(Y \notin X, y_{1\ldots N})}$$

where $S_{ca}$ is the first matching scores, $S_{cb}$ is the second matching scores, $S_i$ is the third matching score, $P_{imposter}(S_{ca})$ is the first probability, $P_{imposter}(S_{cb})$ is the second probability, $P_{genuine}(S_{XY})$ is the third probability, $P_{YX} = P_{genuine}(S_{XY})\, P_{imposter}(S_{ca})P_{imposter}(S_{cb}$ $P_{Xyi}$ is the probability of the matching scores $S_{ca}$, $S_{cb}$, $S_{XY}$ and of the reference biometric identifier matching the i-th biometric identifier of the cohort, $P_{Yyi}$ is the probability of the matching scores $S_{ca}$, $S_{cb}$, $S_{XY}$ and of the input biometric identifier matching the i-th biometric identifier of the biometric identifiers of the cohort, $P(Y \notin X, y_{1\ldots N}) = qP_{imposter}(S_{XY})P_{imposter}(S_{ca})P_{imposter}(S_{cb})$ with q being a prior probability that Y is an imposter who is not matching the reference biometric identifier or the biometric identifiers of cohort, Y is the input biometric.

9. The computer implemented method of claim 1, wherein the verification probability $C_{XY}$ is determined by the equation $$C_{XY} = \frac{z_{XY}}{z_{XY} + \sum_i z_{Xy_i} + \sum_i z_{Yy_i} + q\frac{\sigma}{\bar{\sigma}}}$$

-continued where $z_{Yy_i} = \exp\left(\frac{(S_{Yy_i} - \mu)^2}{2\sigma^2} - \frac{(S_{Yy_i} - \hat{\mu})^2}{2\hat{\sigma}^2}\right)$, $S_{Yy_i}$ is the first matching score, $z_{Xy_i} = \exp\left(\frac{(S_{Xy_i} - \mu)^2}{2\sigma^2} - \frac{(S_{Xy_i} - \hat{\mu})^2}{2\hat{\sigma}^2}\right)$, $S_{Xy_i}$ is the second matching score, $z_{XY} = \exp\left(\frac{(S_{XY} - \mu)^2}{2\sigma^2} - \frac{(S_{XY} - \hat{\mu})^2}{2\hat{\sigma}^2}\right)$, $S_{XY}$ is the third matching score,
$\mu$ is the mean value of the first distribution,
$\sigma$ is the standard deviation of the first distribution,
$\hat{\mu}$ is the mean value of the second distribution,
$\hat{\sigma}$ is the standard deviation of the second distribution,
q is a prior probability that Y is an imposter who is not matching the reference biometric identifier or the biometric identifiers of cohort,
Y is the input biometric.

10. The computer implemented method of claim 1, further comprising the steps of, by the processor:
receiving or accessing multiple candidate biometric identifiers, each of which being associated with a user identifier;
receiving or accessing a user identifier from an input device that is operatively coupled to the processor; and
selecting as the reference biometric identifier one of the multiple candidate biometric identifiers that is associated with substantially the same user identifier as the received user identifier.

11. The computer implemented method of claim 1, further comprising, by the processor, the step of sending a success signal or storing on a data memory success data when the determined verification probability is above a predetermined threshold.

12. The computer implemented method of claim 1, further comprising:
receiving a user identifier and accessing a biometric identifier associated with the user identifier as the reference biometric identifier.

13. A non-transitory computer-readable medium having computer executable instructions for performing a method for verifying an input biometric identifier of a subject against a reference biometric identifier to provide limited and secured access to a system to a limited number of users, the method comprising:
storing a plurality of reference biometric identifiers corresponding to a limited number of authorized users of a system, each reference biometric identifier corresponding to an authorized user and providing limited and secured access for the authorized user to the system;
receiving an input biometric identifier of an intended user of the system, the input biometric identifier being required to match one of the plurality of reference biometric identifiers for controlling limited and secured access to the system;
determining first matching scores, each first matching score representing a similarity between the input biometric identifier and a biometric identifier of a cohort of multiple biometric identifiers, wherein the cohort is initialised to include the reference biometric identifier, to which the input biometric identifier is required to be matched for access to be secured, as one of an initial cohort;
determining or accessing second matching scores, each second matching score representing a similarity between the reference biometric identifier and a biometric identifier of the cohort;
determining a third matching score representing a similarity between the input biometric identifier and the reference biometric identifier; and
determining a verification probability for the input biometric identifier based on the determined first, second and third matching scores, using probability density functions;
verifying the subject based on the verification probability;
determining that the intended user is one of the limited number of authorized users based on the verification probability and granting access to the system;
wherein determining the verification probability comprises determining a first probability of the first matching scores, determining a second probability of the second matching scores, and determining a third probability of the third matching scores, and multiplying the first, second and third probabilities together;
wherein matching scores of all pairs of the multiple biometric identifiers of the initial cohort are determined and stored, and the step of determining or accessing the second matching scores comprises accessing matching scores for all pairs of the multiple biometric identifiers of the initial cohort that contain the reference biometric identifier to which the input biometric identifier is required to be matched for access to be secured;
wherein the reference biometric identifier to which the input biometric identifier is required to be matched for access to be secured is removed from the initial cohort.

14. A computer system for verifying an input biometric identifier of a subject against a reference biometric identifier to provide limited and secured access to a second system to a limited number of users, the computer system comprising:
an input port configured to receive an input biometric identifier of an intended user of a second system; and
a processor:
to store a plurality of reference biometric identifiers corresponding to a limited number of authorized users of the second system, each reference biometric identifier corresponding to an authorized user and providing limited and secured access for the authorized user to the second system;
to receive the input biometric identifier of the intended user of the second system, the input biometric identifier being required to match one of the plurality of reference biometric identifiers for controlling limited and secured access to the second system;
to access or receive the input biometric identifier;
to access or receive the reference biometric identifier, and
to access or receive a cohort comprising multiple biometric identifiers, wherein the cohort is initialised to include the reference biometric identifier, to which the input biometric identifier is required to be matched for access to be secured, as one of an initial cohort;

to determine first matching scores, each first matching score representing a similarity between the input biometric identifier and one biometric identifier of the cohort;

to access or determine second matching scores, each second matching score representing a similarity between the reference biometric identifier and one biometric identifier of the cohort; and to determine a third matching score representing a similarity between the input biometric identifier and the reference biometric identifier and to determine a verification probability for the input biometric identifier based on the determined first, second and third matching scores, using probability density functions;

to verify the subject based on the verification probability;

to determine that the intended user is one of the limited number of authorized users based on the verification probability and granting access to the second system;

wherein determining the verification probability comprises the processor determining a first probability of the first matching scores, determining a second probability of the second matching scores, determining a third probability of the third matching scores, and multiplying the first, second and third probabilities together; and wherein matching scores of all pairs of the multiple biometric identifiers of the initial cohort are determined and stored, and the step of determining or accessing the second matching scores comprises accessing matching scores for all pairs of the multiple biometric identifiers of the initial cohort that contain the reference biometric identifier to which the input biometric identifier is required to be matched for access to be secured;

wherein the reference biometric identifier to which the input biometric identifier is required to be matched for access to be secured is removed from the initial cohort.

15. The computer system of claim 14, further comprising a memory to store the reference biometric identifier and the multiple biometric identifiers of the cohort.

* * * * *